United States Patent [19]

Motodate et al.

[11] Patent Number: 4,908,540
[45] Date of Patent: Mar. 13, 1990

[54] ELECTRIC GENERATOR FOR VEHICLES

[75] Inventors: Shoji Motodate, Saitama; Nobuaki Komuro; Yukio Miyamaru, both of Tokyo, all of Japan

[73] Assignee: Honda Giken Kogyo Kabushiki Kaisha, Tokyo, Japan

[21] Appl. No.: 256,226

[22] Filed: Oct. 12, 1988

Related U.S. Application Data

[63] Continuation of Ser. No. 128,141, Dec. 3, 1987, abandoned.

[30] Foreign Application Priority Data

Feb. 27, 1987 [JP] Japan .................................. 62-44612

[51] Int. Cl.[4] ...................... H02K 13/00; F02N 11/04
[52] U.S. Cl. .................................. 310/240; 310/113; 310/68 E; 290/46
[58] Field of Search ................. 310/68 B, 68 D, 68 E, 310/113, 230, 240, 241; 290/32, 38 R, 46

[56] References Cited

U.S. PATENT DOCUMENTS

| | | | |
|---|---|---|---|
| 3,577,002 | 5/1971 | Hall et al. | 290/46 |
| 3,590,262 | 6/1971 | Sheffield et al. | 290/46 |
| 3,879,624 | 4/1975 | Jones | 310/240 |
| 4,219,739 | 8/1980 | Greenwell | 290/46 |
| 4,704,552 | 11/1987 | Masterman | 290/46 |
| 4,754,154 | 6/1988 | Motodate | 290/46 |

FOREIGN PATENT DOCUMENTS 61-25334  9/1978  Japan .

Primary Examiner—Patrick R. Salce
Assistant Examiner—Judson H. Jones
Attorney, Agent, or Firm—Lyon & Lyon

[57] ABSTRACT

An electric generator organization, particularly adapted for small vehicles such as motorcycles, is described in which a rectifier mechanism electrically disposed between the stator and the rotor is mechanically connected to the rotor for rotation therewith during engine startup and disconnected therefrom during periods of normal engine operation. An operating circuit enables efficient transmission of electric current from the battery to starting coils in the generator only during the period of engine startup. During periods of normal engine operation, the transmission of electric current is from generating coils in the generator to the battery. Included in the operating circuit is an engine operation detector that prevents excessive current feed from the generator coils to the rectifier mechanism.

14 Claims, 3 Drawing Sheets

ELECTRIC GENERATOR FOR VEHICLES

BACKGROUND OF THE INVENTION

This application is a continuation of application Ser. No. 128,141 filed Dec. 3, 1987, now abandoned.

The present invention relates to an electric generator for a vehicle, as for example, a motorcycle or the like, and more particularly, to an improved vehicle electric generator having an engine starting capability.

Electric generators for vehicles comprising, in combination, a motor mechanism for starting the engine and a generating mechanism for generating electric current after the engine has been started are known, as for example as described in Japanese Patent Application Nos. 60-194601 (No. 194601/1985) and 60-194602 (No. 194602/1985).

In these vehicle generating apparatus, brushes are provided on a clutch-like member for actuation in an axial direction and are adapted to move into contact with the stator when starting, and to release their contact after starting.

It has been proposed to miniturize the above described vehicle generator. In such arrangements, however, if the generator starts to generate electric current upon rotation of the crankshaft during the startup of the engine, the generated electromotive force appears in the starting coils beyond the period when the startup operation is terminated whereby starting efficiency of the engine is reduced.

Accordingly, the present invention has as an object to provided a vehicle generating arrangement adapted for miniaturization and which is superior in its engine starting efficiency.

SUMMARY OF THE INVENTION

In order to attain this object, there is provided an electric generator organization for a vehicle including a stator having starting coils and generating coils; and a rotor connected to the engine crankshaft and containing field magnets movable with respect to the starting and generating coils. A rectifier mechanism is operably interposed between the stator and the rotor, which rectifier mechanism includes a brush holder carrying brushes effective to establish an electric circuit between a battery and the starting coils during engine startup. The brush holder is so arranged as to rotate with the rotor only until a predetermined value of rotational velocity is attained, whereupon the brush holder is disconnected from the rotor to minimize wear on the brushes.

The electric generator organization of the invention further contemplates the imposition of switch means between the battery and the rectifier mechanism operative for the conduct of electric current from the battery to the starting coils during startup of the engine and for the conduct of electric current from the generating coils to the battery during other periods of engine operation.

A switch circuit may also be provided to terminate the flow of electric current to the rectifier mechanism when the rotational velocity of the engine crankshaft exceeds a predetermined value.

The components of the electric generator organization are arranged to achieve economy of space thereby enhancing the ability to miniturize the generator assembly.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENTS OF THE INVENTION

Figure 1:
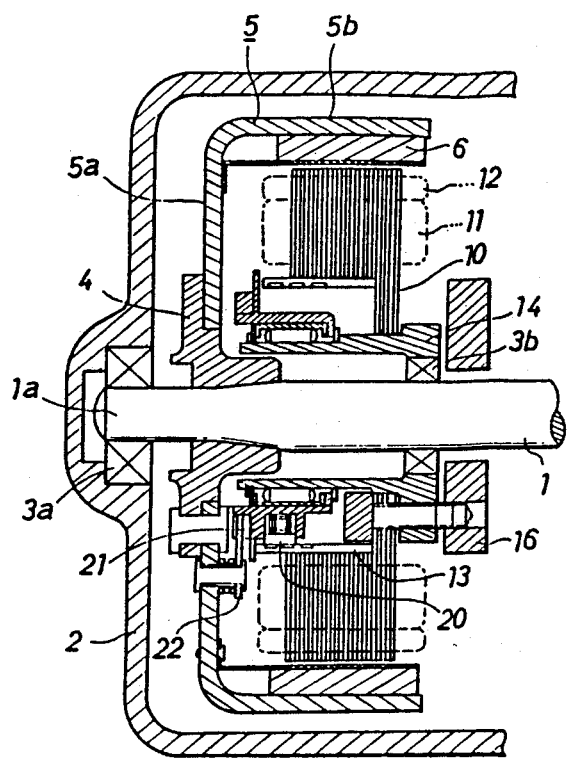
FIG. 1 is a sectional elevation view illustrating an electric generator organization for a vehicle embodying the present invention.
Figure 2:
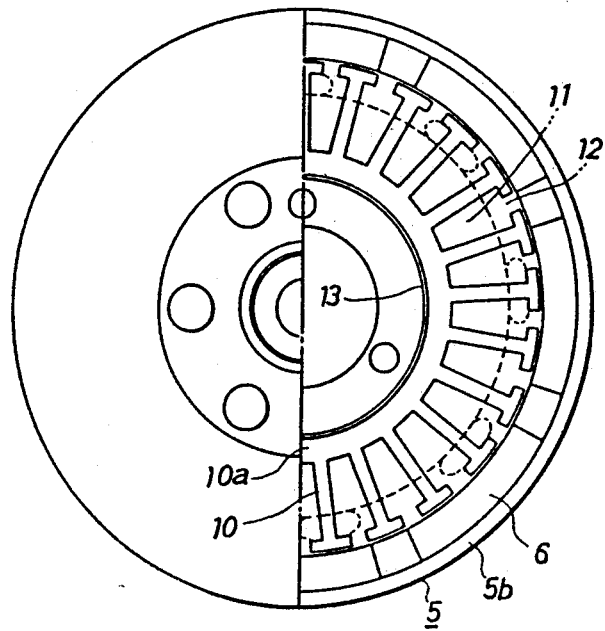
FIG. 2 is a plan view illustrating the structural relationship between the stator and the rotor of the electric generator organization of FIG. 1.

According to FIG. 1, a rotary shaft 1, such as the crankshaft, or the like, of an engine extends into the casing of the vehicle generating set. The leading end 1a of the rotary shaft 1 is rotatably supported in a bearing 3a, which is secured to an end plate 2 constituting the casing. Also, an intermediate portion of the rotary shaft 1 is supported on a bearing 3b secured to a stator holder 14 described hereinafter. On the rotary shaft 1 is fixed a rotor frame 5 through the intermediary of a bracket 4. The rotor frame 5 comprises of a radially extending planar portion 5a and a generally cylindrical side surface portion 5b offset substantially perpendicuarly from the planar portion 5a. Within the inner periphery of the side surface portion 5b are arranged a plurality of circumferentially spaced field magnets 6 (FIG. 2). Such a rotor frame 5 and field magnets 6 constitute a rotating mass that acts as a flywheel.

Figure 3:
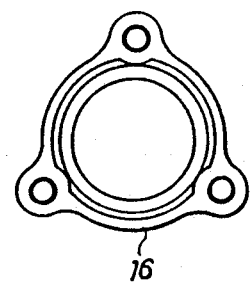
FIG. 3 is a plan view illustrating the stator mounting member according to the present invention.
Figure 7:
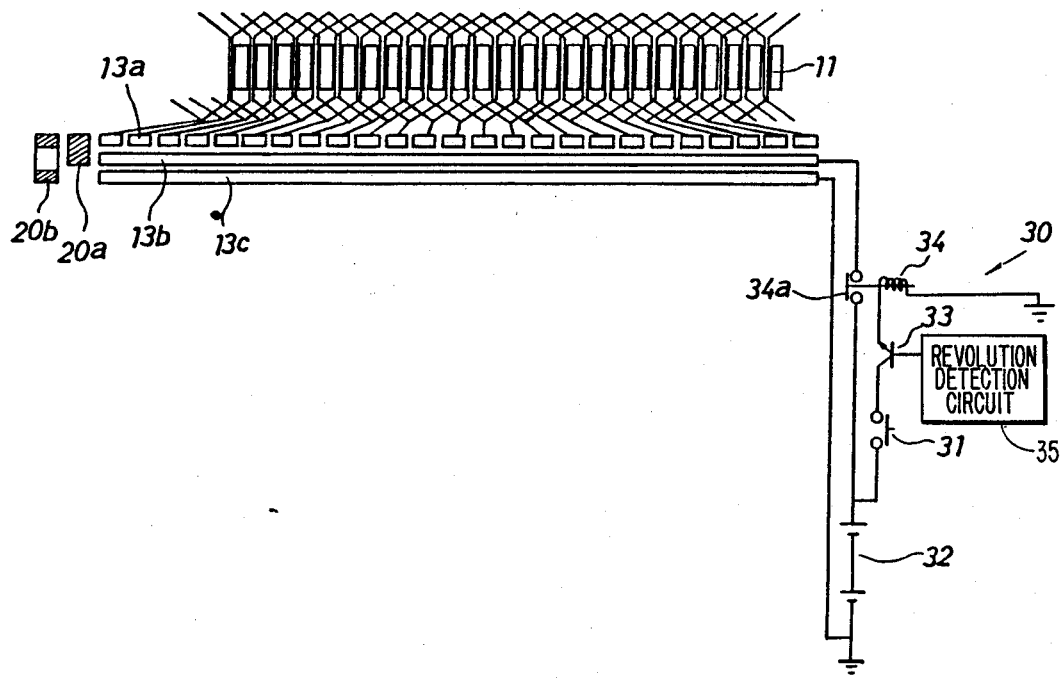
FIG. 7 is a schematic electric diagram of the electric generator organization according to the present invention.

The stator comprises of a plurality of circumferentially spaced yokes 10 of stacked sheet iron that extend radially from an annular portion 10a (FIG. 2), and starting and generating coils 11 and 12, respectively, arranged circumferentially on the yokes 10. The starting coils 11 are arranged radially within the generating coils 12. Also, a rectifier mechanism is disposed inside of the starting and generating coils 11 and 12 and, therefore, inside the yokes 10. That is, within the inner periphery of the yokes 10 is arranged a cylindrical, electrically insulated contact member 13. On this contact member are formed a plurality of conducting paths 13a, 13b and 13c, which are best illustrated in the generated view of FIG. 7. The yokes 10, having such starting and generating coils 11 and 12, are assembled, together with a cylindrical stator holder 14, to a stator mounting member 16 (FIG. 3) fixed to the casing by means of bolts, or the like. The stator holder 14 is a hollow cylindrical member mounted to the rotary shaft 1 via the bearing 3b.

Between the stator holder 14 and the contact member 13 is an annularly extending brush holder 21 on which a brush 20 is mounted.

Figure 4:
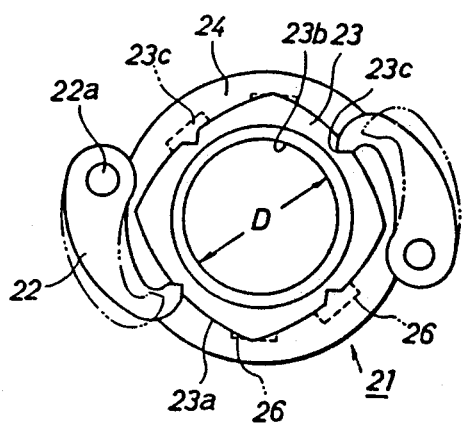
FIG. 4 is an end view illustrating the brush holder according to the present invention.
Figure 5:
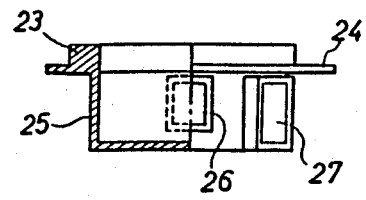
FIG. 5 is a partial sectional view of the brush holder of FIG. 4.
Figure 6:
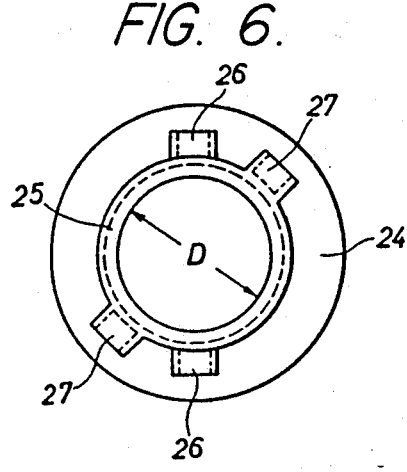
FIG. 6 is an end view, opposite that of FIG. 4, of the brush holder of the present invention.

As shown in FIGS. 4 to 6, the brush holder is provided with a cam portion 23, a disc portion 24 and a cylindrical portion 25 when viewed from a side close to the leading end 1a of the rotary shaft 1. The cam portion 23 has an outer periphery 23a formed generally as a square having slightly arcuately expanded sides, and a through-bore 23b through which the stator holder 14 passes. On each of the arcuate sides 23a of the outer periphery of the brush holder 21 is formed a notch 23c with which the leading end of a pair of governor arms 22 engage, the latter being fixed to the rotor frame 5 by pivot pins 22a. The two governor arms 22 are arranged at positions spaced 180° from each other. The disc portion 24 has a larger diameter as compared with those of the cam portion 23 and the cylindrical portion 24, and is dimensioned to radially cover the end of the contact member 13. Adjacent the disc portion 24 is the cylindrical portion 25, which has an inner diameter D substantially equal to the inner diameter D of the cam portion 23. At two positions spaced 180° from each other on the cylindrical portion 25 are formed two first holder portions 26, which are each adapted to form integrally with the cylindrical portion a rectangular framelike member extending radially outwardly from the cylindrical portion.

In each holder portion 26 is provided a rectifying brush 20 that is biased radially outwardly through the intermediary of a spring (not shown). The brush 20 includes a brush member 20a (FIG. 7) for contacting the conducting paths 13a and 13b. Also, two second holder portions 27 are formed which are spaced by 180° from each other and which are arranged, respectively, at positions rotated by 45° from the first holder portions 26. Each of these second holder portions 27 is a rectangular frame-like member, similar to the first holder portion 26, and is provided with a rectifying brush 20 that is biased radially outwardly through the intermediary of a spring (not shown). This brush 20 includes a brush member 20b (FIG. 7) for contacting the conducting paths 13a and 13c. The geometrical arrangement of the brushes 20a and 20b is set to meet current phases of the brushes so that a rotary torque generates between the field magnets 6 and the starting coils 11. Also, the position of the notches 23c in the cam portion 23 of the brush holder 21 is determined from such a point of view.

The governor arms 22, mentioned above, are fixed to the rotor frame 5 for rotation therewith. For this reason, when the rate of rotor revolution is low, the leading end of each governor arm 22 is in a condition engaging a notch 23c of the brush holder 21, whereby the latter is caused to rotate together with the rotor. However, when the rate of rotor revolution increases, the governor arms 22 pivot outwardly about the pins 22a due to the centrifugal force produced by the rotation of the rotor. For this reason, the leading ends of the governor arms 22 are released from the notches 23c of the brush holder 21, and the latter stops rotating because it is no longer connected with the rotor frame 5. The rate of rotor revolution at which the engagement of the governor arms 22 and the brush holder 21 is released can be conveniently set by means of the shape of the governor arms 22 and the force of a spring (not shown) adapted to pull each governor arm 22 radially inwardly.

Figure 8:
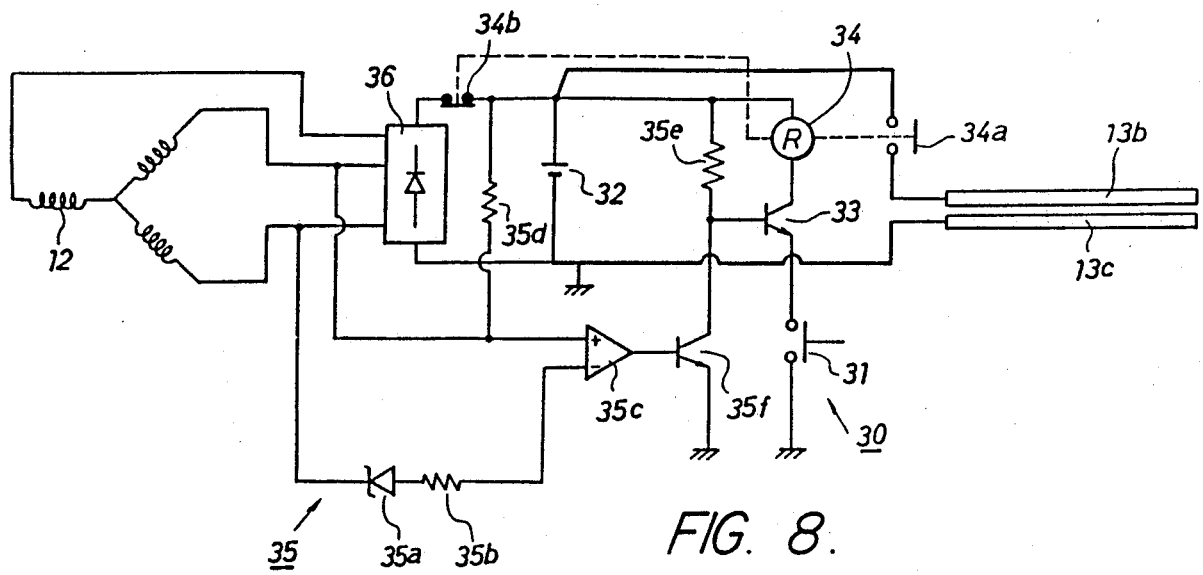
FIG. 8 is an electric circuit diagram of the revolution detecting circuit incorporated in the electric generator organization of the present invention.

Each of the conductors of the starting coil 11 is connected with each of the contact pieces 13a in a predetermined manner on the basis of the number of poles of the field magnets 6. Under each of the contact pieces 13a are arranged a series of conducting paths 13b and 13c in parallel with each other. The conducting path 13b is connected to a switch circuit 30 and the conducting path 13c goes to ground. The switch circuit 30 is designed to energize the starting coil on the basis of the operation of a starter button 31. That is, when the starter button 31 is closed, a relay coil 34, described in detail in connection with FIG. 8, is energized through the intermediary of a transistor 33 (described hereinafter) existing in its ON condition. Thus, contact 34a of the relay coil 34 is closed, and current from the battery source 32 flows in series to the conducting path 13b, the brush 20a, the contact piece 13a, the starting coil 11, the brush 20b, and the conducting path 13c, thereby to form an electric field crossing the field magnets 6 so as to rotate the rotor. In this way, a starting torque is generated.

In this arrangement the transistor 33 is turned off by a revolution detecting circuit, schematically represented by the block 35, as shown in FIG. 8. The transistor 33 is in the ON condition when the rotor is stopped or when its rate of revolution is low. The transistor 33 goes to the OFF condition when the number of revolutions of the rotor reaches a predetermined value. FIG. 8 illustrates the details of such a switch circuit 30 wherein a charge current is supplied to the battery source 32 via a relay switch 34b by rectifying the output of the generating coil 12 through the rectifier circuit 36.

This contact of the relay switch 34b is actuated by the relay coil 34 and disconnects the generating coil 12 and the battery source 32 only when closing the contact 34a, as previously mentioned. Also, the relay contact 34b is designed to connect the generating coil 12 with the battery source 32 when the contact 34a is opened, that is, when the starter button 31 is not operated.

It will be appreciated that, by allowing the relay switches 34, 34a and 34b to interpose between the generating coil 12, the battery source 32 and the starting coil 11, it is possible to prevent the electromotive force generated by the generating coil 12 to be applied to the starting coil 11 as an inverse electromotive force when starting the engine by the operation of the starter button 31, whereby the start of the engine can be more efficiently performed.

The revolution detecting circuit 35 illustrated in FIG. 8 supplies one phase line voltage of such a generating coil 12 to an inverted input of an operational amplifier 35c through the intermediary of a constant voltage circuit consisting of a series connection of a Zener diode 35a and a resistor 35b. Also, the voltage of the positive side of the rectifier circuit 36 and, therefore, of the positive side of the battery source 32 is supplied to a non-inverted input of the operational amplifier 35c via a resistor 35d. To the non-inverted input of this operational amplifier 35c, also, is connected the other phase of the generating coil 12. Such operational amplifier 35c serves as a comparator. An output terminal of the operational amplifier 35c is connected to the base of a switching transistor 35f connected in series with a resistor 35e connected to the positive side of the source. The transistor 35f is a npn type and its emitter is grounded. A junction of the resistor 35e and the transistor 35f is connected with the base of the transistor 33 of the switch circuit 30. That is, the output of the junction is the output of the revolution detecting circuit 35.

The revolution detecting circuit 35 is actuated in the following manner. For example, if the engine does not start because there is no output from the generating coil 12, only the voltage of the battery source 32 is applied to the operational amplifier 35c via the resistor 35d. For this reason, the operational amplifier 35c does not generate its output and the transistor 35f is in its OFF condition, whereby the circuit 35 does not generate the output. Next, when the engine starts by the operation of the starter button 31, the generating coil 12 feeds the output. When the number of crankshaft revolutions is low, as for example immediately after the engine starts, the output voltage is less than a set voltage of the constant voltage circuit 35 consisting of Zener diode 35a and resistor 35b and, therefore, the output of the circuit 35 does not change. As the number of crankshaft revolutions gradually increases when the output voltage of the generating coil 12 increases and exceeds the set voltage of the constant voltage circuit 35 of elements 35a and 35b, the operational amplifier 35c generates the output and brings the transistor 35f into the ON condition. For this reason, the base potential of the transistor 33 is lowered and assumes the OFF condition. As mentioned hereinafter, during this period, the electrical feed to the contact member 13 and, therefore, to the starting coil 11 is stopped.

When considering the above, the set value of the constant voltage circuit 35 of elements 35a and 35b is so determined that the electrical feed is continued to the starting coil 11 at the number of revolutions (200-300 rpm) immediately after the engine starts and stopped before reaching the idle revolution number (near 1000 rpm). Also, the previously mentioned governor arm 22 (FIG. 4) is designed to release at a predetermined number of revolutions near the idle revolution number. However, the number of revolutions at which the governor arm 22 is released is set at a higher value than the number detected by the revolution detecting circuit 35 so as to stop the electrical feed to the starting coil 11 prior to release of the governor arms 22.

The operation of the entire described generator system is as follows. When the starter button 31 (FIGS. 7 and 8) is pushed upon starting the engine, electric current flows into the relay 34 because the transistor 33 is in the ON condition, whereby contact 34a of relay 34 closes and contact 34b opens. For this reason, current flows from the battery source 32 via the aforementioned path (the conducting path 13b, the brush 20a, the contact member 13, the starting coil 11, the brush 20b, and the conducting path 13c), whereby rotary torque is imparted to the rotor. During this time, since the brush holder 21 is connected to the rotor through the intermediary of the governor arms 22, once the rotor starts to rotate, the brush holder 21 rotates whereby conductors of the starting coil 11 are supplied, one after another, and the rotor continues to rotate. As a result of this, the generating coil starts to generate electricity, but because the contact 34b is open at this time, the electromotive force of the generating coil 12 does not act on the starting coil 11 as the inverse electromotive force. If the engine starts within this period, the rotation of the rotor and, therefore, the number of revolutions of the rotary shaft 1 or the rotor frame 5 increases. The increase in this rate of revolution is monitored by the revolution detecting circuit 35 (FIGS. 7 and 8), and for example, if the number of revolutions reaches 600 rpm, the operational amplifier 35c of the revolution detecting circuit 35 actuates, whereby the transistor 35f assumes the ON condition. If the transistor 35f assumes the ON condition, the potential of the transistor 33 is reduced to the ground potential so as to produce the OFF condition, whereby the relay 34 is adapted to be interrupted from its conducting condition. Therefore, the relay contact 34a opens and the electrical feed to the conducting paths 13b, 13c and therefore the feed to the starting coil 11 is stopped, whereby the supply of charge current of the generaring coil 12 to the battery source is initiated. Further, during this time, the brush holder 21 continues to rotate with the rotor, and further, if the number of revolutions increases, for example, to become 1500 rpm, the governor arms 22 disengage from the brush holder 31, whereby the latter cease rotating together with the rotor thereby to become stationary. In this condition, the engine crankshaft continues to rotate constantly whereby electric power is produced by the generating coil 12 by rotation of the field magnets 6.

As is apparent from the aforementioned description, according to the described arrangement, when at least the starter button 31 is operated, it is possible to interrupt the generating coil 12 and the battery source 32, whereby the voltage due to the generating coil 12 can be prevented from acting on the starting coil 11 as the inverse electromotive force. Thereafter, if the operation of the starter button 31 is continued, the electric feed to the starting coil can be automatically interrupted by the action of the revolution detecting circuit 35 and the charge of the battery source 32 can simultaneously be started. Consequently, the invention produces beneficial results.

Figure 9:
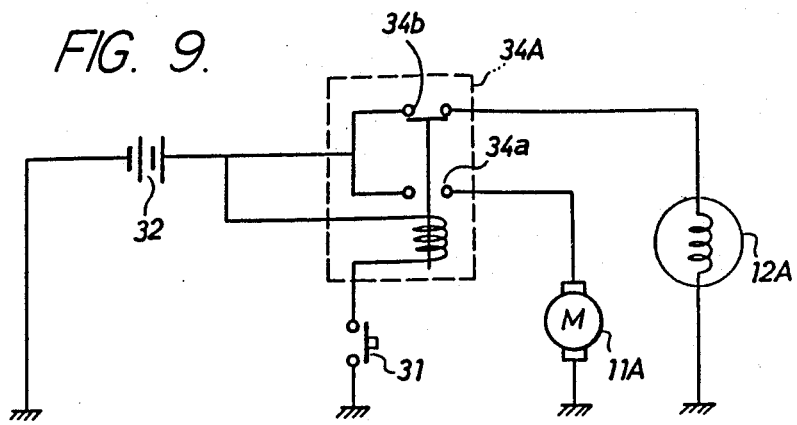
FIGS. 9 and 10 are electric circuit diagrams illustrating other embodiments of the present invention.
Figure 10:
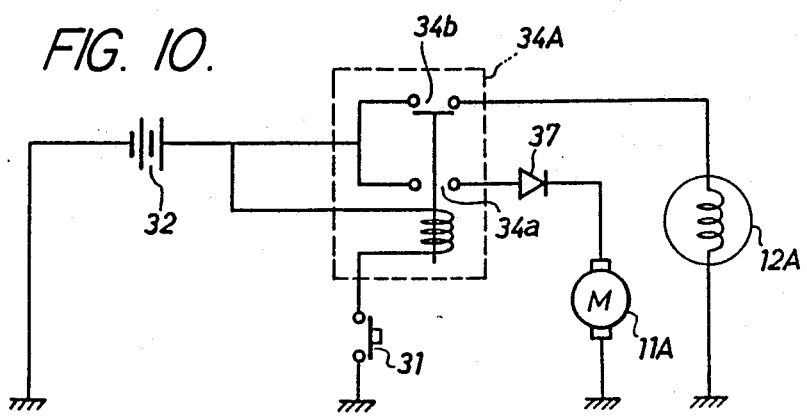

Further, it should be appreciated that the invention is not limited to the described embodiment, and naturally, can be applied to a generating system in which the revolution detecting circuit is omitted, for example, as shown in FIGS. 9 and 10, so as to be capable of effectively starting the engine. FIG. 9, on the one hand, illustrates an enbodiment of the present invention in which, as a matter of convenience, a motor 11A containing the starting coil, and a generator 12A having the generating coil are employed as separate elements. According to this embodiment, a relay switch 34A is provided between the battery source 32 and the generator 12A and the motor 11A so as to be energized by closing the starter button 31. Thus, contact 34a is closed only when operating the starter button 31 so as to connect the battery source 32 and the motor 11A. During this time, contact 34b between the battery source 32 and the generator 12A opens thereby to prevent the voltage generated by the generator 12A from being applied to the motor 11A as an inverse electromotive force. The motor 11A and the battery source 32 are interrupted by release of the starter button 31 after starting the engine whereby the battery source 32 can be charged by the generator 12A.

Further, in the embodiment shown in FIG. 10, a diode 37 having the motor direction as a forward direction is inserted between the motor 11A and the relay switch 34A shown in FIG. 9. After starting the engine, if closure of the starter button 31 is continued, the electric power (inverse electromotive force) generated by the motor 11A flows inversely to the battery source 32, whereby the motor is prevented from acting as a load so as to protect the brushes.

According to the present invention, as mentioned above, the starter button and the generating coil are organized so that the starting coil and the battery source are connected only when started by the starter button, and further, the generating coil and the battery source are interrupted only when started by the starter button. Accordingly, the generating set is capable of being structurally miniturized and the start of the engine can be effectively accomplished at a reduced cost of energy.

It should be further understood that, although a preferred embodiment of the invention has been illustrated and described herein, changes and modifications can be made in the described arrangement without departing from the scope of the appended claims.

We claim:

1. An electric generator apparatus for a vehicle having an engine comprising:
   a stator having starting coils, generating coils and a current supply path for supplying electric current from a battery to said starting coils during startup of said engine;
   a rotor having field magnets operatively positioned with respect to said starting and generating coils on said stator;
   a rectifier mechanism incuding a brush holder containing a brush for electric coupling with said current supply path; and
   means for connecting said brush holder to said rotor for rotation therewith during a predetermined range of engine operation, said means including means for disconnecting said brush holder from said rotor when said engine operation is outside said predetermined range.

2. The apparatus according to claim 1 in which said brush holder includes a cylindrical member concentrically disposed about said rotor and governor means carried by said rotor, said governor means being operative to connect said brush holder to said rotor up to a predetermined value of rotational velocity thereof and to disconnect said brush holder from said rotor when the rotational velocity of said rotor exceeds said predetermined value.

3. The apparatus according to claim 2 in which said governor means comprises an arm pivotally mounted at one end to said rotor and having means at its other end for releasably engaging said brush holder, said arm being arranged on said rotor to move from engagement with said brush holder to disengage therefrom under the influence of centrifugal force imposed on said arm by rotation of said rotor.

4. The apparatus according to claim 3 including switch means electrically connected between said battery and said rectifier mechanism operative to transmit electric current between said battery and said rectifier mechanism during startup of said engine and to transmit electric current between said generating coils and said battery during periods of normal engine operation.

5. The apparatus according to claim 4 including a switch circuit for terminating the conduct of electric current between said generating coils and said battery in response to the current output of said generating coils.

6. The apparatus according to claim 5 in which said switch circuit includes means for detecting the rotational velocity of the crankshaft of said engine; means for comparing the detected rotational velocity with a predetermined value thereof; and means for terminating the transmission of electric current from said battery to said rectifier mechanism when said crankshaft velocity exceeds said predetermined value.

7. An electric generator apparatus for a vehicle having an engine including a crankshaft comprising:
   a stator having starting coils, generating coils and a current supply path for supplying electric current from a battery to said starting coils during startup of said engine;
   a rotor having field magnets operatively positioned with respect to said starting and generating coils on said stator;
   a rectifier mechanism including a brush holder containing a brush for electric coupling with said current supply path;
   centrifugal means for operating said brush holder for uncoupling said starting coils from said battery when the velocity of said crankshaft exceeds a predetermined value; and
   switch means electrically connected between said battery and said rectifier mechanism operative to transmit electric current between said battery and said rectifier mechanism during startup of said engine, said switch means including means for terminating the transmission of electric current from said battery to said rectifier mechanism before the uncoupling of said starting coils from said battery by said centrifugal means.

8. The apparatus according to claim 7 in which said switch means is operative to transmit electric current between said generating coils and said battery during periods of normal engine operation.

9. The apparatus according to claim 7 in which said switch means includes means for detecting the rotational velocity of the crankshaft of said engine; means for comparing the detected rotational velocity with a predetermined value thereof; and means for terminating the transmission of electric current from said battery to said rectifier mechanism when said crankshaft velocity exceeds said predetermined value.

10. An electric generator apparatus for a vehicle having an engine comprising:
    a stator having starting coils, generating coils and a current supply path for supplying electric current from a battery to said starting coils during startup of said engine;
    a rotor having field magnets operatively positioned with respect to said starting and generating coils on said stator; and
    a rectifier mechanism having a brush holder containing a brush for electric coupling with said current supply path, said rectifier mechanism, including said brush, being disposed substantially laterally adjacent and radially inwardly of at least one of said starting coils and said generating coils.

11. An electric generator apparatus for a vehicle having an engine including a crankshaft comprising:
    a stator having starting coils, generating coils and a current supply path for supplying electric current from a battery to said starting coils during startup of said engine;
    a rotor having field magnets operatively positioned with respect to said starting and generating coils on said stator;
    a rectifier mechanism including a brush holder containing a brush for electric coupling with said current supply path;
    switch means electrically connected between said battery and said rectifier mechanism operative to transmit electric current between said battery and said rectifier mechanism during startup of said engine, said switch means including means for sensing the output voltage of said generating coils for detecting the rotational velocity of the crankshaft of said engine; means for comparing the detected rotational velocity with a predetermined value thereof; and means for terminating the transmission of electric current from said battery to said rectifier mechanism when said crankshaft velocity exceeds said predetermined value.

12. The apparatus according to claim 10 in which said starting coils and said generating coils are mounted in mutual concentric relation on said stator.

13. The apparatus according to claim 10 in which said field magnets are arranged on said rotor in concentric radially outward disposition with respect to said starting coils and said generating coils.

14. The apparatus according to claim 12 in which said field magnets are arranged on said rotor in concentric radially outward disposition with respect to said starting coils and said generating coils.

* * * * *